United States Patent [19]

Asami

[11] 4,404,942
[45] Sep. 20, 1983

[54] METHOD OF CONTROLLING THE ROTATIONAL SPEED OF A ROTARY SHAFT

[75] Inventor: Ken Asami, Nagoya, Japan
[73] Assignee: Toyota Jidosha K.K., Toyota, Japan
[21] Appl. No.: 285,591
[22] Filed: Jul. 21, 1981
[30] Foreign Application Priority Data Jul. 26, 1980 [JP] Japan .......................... 55/101866

[51] Int. Cl.³ .................... B60K 31/00; F02D 11/10
[52] U.S. Cl. .................................... 123/352; 180/176; 364/431.07
[58] Field of Search ............. 123/339, 352, 353, 354; 180/176, 179; 364/431.07

[56] References Cited
U.S. PATENT DOCUMENTS 3,891,046  6/1975  Oicles .......................... 123/352 X
4,321,901  3/1982  Kobayashi et al. .......... 123/352
4,328,776  5/1982  Kono et al. .................. 123/352

Primary Examiner—Tony M. Argenbright
Attorney, Agent, or Firm—Kenyon & Kenyon

[57] ABSTRACT

Speed pulses having a frequency proportional to an actual rotational speed V of a rotary shaft are generated. A period T of time which is necessary for generating a predetermined number of the speed pulses is measured, and then the difference $\Delta T$ between the measured time T and a predetermined time to which is equal to the measured time T when the rotary shaft rotates at a desired speed $V_o$ is calculated. A number N of the speed pulses generated within a predetermined period of time is measured. Thereafter, the calculated difference $\Delta T$, the measured number N and a predetermined number $N_o$ which is equal to the measured number N when the rotary shaft rotates at the desired speed $V_o$ are multiplied by each other to obtain a value $\Delta V$ which corresponds to the difference between the actual speed V and the desired speed $V_o$. Then, in response to the calculated value $\Delta V$, the rotational speed of the rotary shaft is controlled to reduce the above-mentioned difference to zero.

17 Claims, 2 Drawing Figures

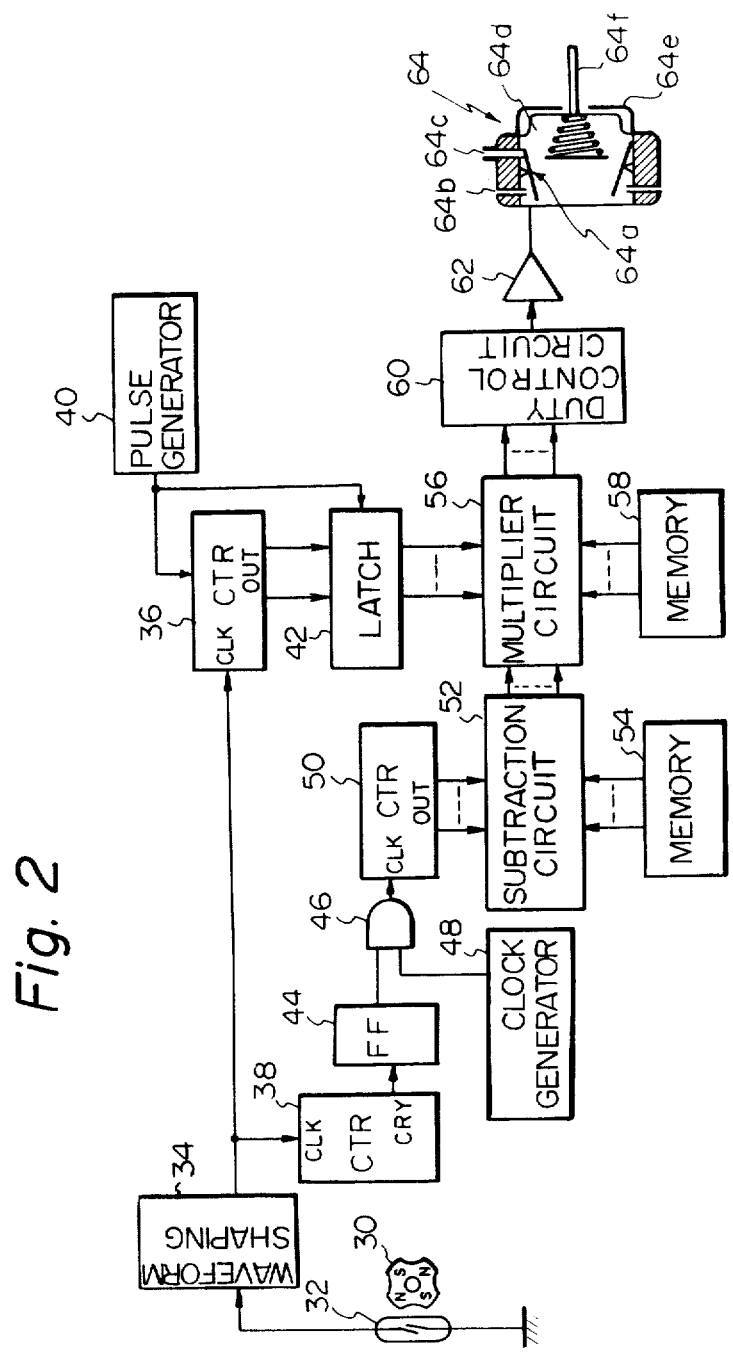

METHOD OF CONTROLLING THE ROTATIONAL SPEED OF A ROTARY SHAFT

BACKGROUND OF THE INVENTION

The present invention relates to a method of controlling the rotational speed of a rotary shaft by feedback.

To control by feedback the rotational speed of a crank shaft of an automobile or the rotational speed of a drive shaft coupled to the drive wheel of an automobile, the actual rotational speed of the rotary shaft is, first, detected, and then the difference between the detected rotational speed and a desired rotational speed is calculated. Thereafter, the opening degree of the throttle valve or other speed control valve is adjusted in response to the calculated difference to control the rotational speed of the engine of the automobile. In general, the rotational speed of the rotary shaft is detected by generating a pulse each time the shaft advances by a predetermined angle. These pulses pass through an open a predetermined number of pulses, for example, 12 pulses, are generated, and by to count using a binary counter, the number of clock pulses that pass through the gate while this gate is open. To control the rotational speed depending upon the difference between the detected rotational speed and the desired rotational speed, the actual rotational speed must be detected with good precision. According to the above-mentioned conventional method, it is possible to detect the rotational speed with relatively high precision. However, the following problem occurs: since the content of the binary counter is inversely proportional to the actual rotational speed, it is necessary to execute a division operation with respect to the content of the counter in order to obtain a signal proportional to the actual rotational speed. The division operation usually requires an increased number of digits to secure the same precision as the other arithmetic operations and hence, requires an increased number of operation steps, causing the operation time to take longer.

SUMMARY OF THE INVENTION

It is, therefore, an object of the present invention to provide a method of controlling the rotational speed of a rotary shaft, which method is capable of reducing the number of operation steps in the control operation as well as reducing the operation time, without deteriorating the control precision.

Another object is to provide apparatus for controlling the rotary speed of a shaft.

According to the present invention, a rotational speed control method for a rotary shaft includes the generation of speed pulses having a frequency proportional to the actual rotational speed V of the rotary shaft and measuring a time T until a predetermined number of speed pulses are generated. The the difference $\Delta T$ between the measured time $T$ and a predetermined time $T_o$, which is equal to the measured time $T_o$, when the rotary shaft rotates at a desired rotational speed $V_o$, is calculated. The number N of the speed pulses generated within a predetermined period of time is measured and is multiplied by the calculated difference $\Delta T$ and a predetermined number $N_o$, which is equal to the measured number N when the rotary shaft rotates at the desired rotational speed $V_o$. The multiplication is performed to obtain a value $\Delta V$ equivalent to the difference between the actual rotational speed V and the desired rotational speed Vo, and the rotational speed of the rotary shaft is controlled in response to the value $\Delta V$ to reduce the difference between the actual rotational speed V and the desired rotational speed $V_o$ to zero.

The above and other related objects and features of the present invention will be apparent from the description of the present invention set forth below, with reference to the accompanying drawings, as well as from the claims.

BRIEF DESCRIPTION OF THE DRAWINGS

FIG. 2 is a diagram illustrating an embodiment of the present invention.

DETAILED DESCRIPTION OF THE PREFERRED EMBODIMENT

Figure 1:
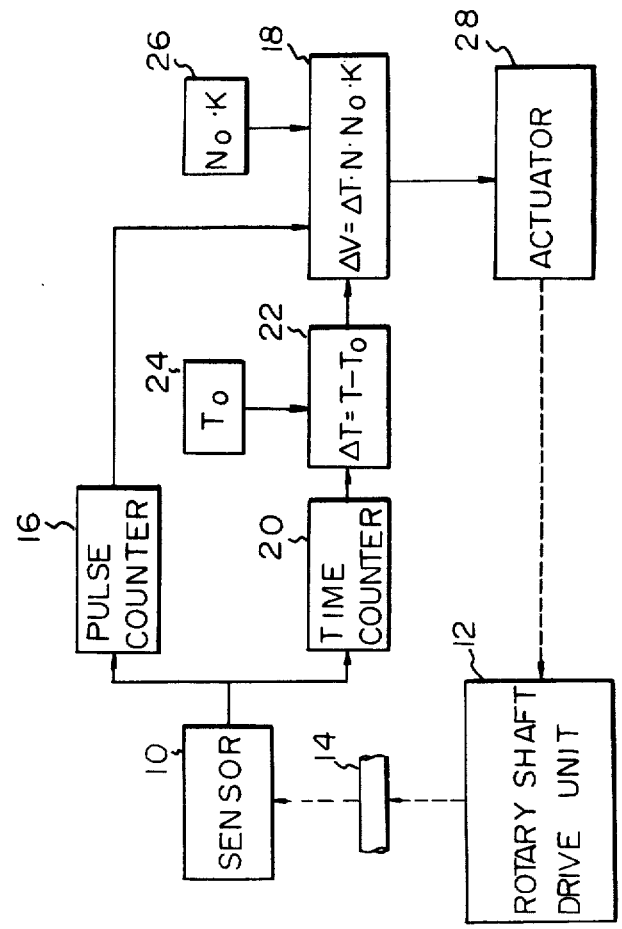
FIG. 1 is a block diagram schematically illustrating the concept of the present invention.

Referring to FIG. 1, reference numeral 10 denotes a sensor which generates a pulse each time a rotary shaft 14 advances by a predetermined angle. The rotary shaft 14 is driven by a rotary shaft drive unit 12. Pulses from the sensor 10 are fed to a counter 16 which counts the number N of pulses generated within a predetermined period of time. The counted value N is roughly proportional to the rotational speed V of the rotary shaft 14, though the precision is not so high, and is multiplied by other values in a multiplier 18. Pulses from the sensor 10 are also fed to a counter device 20 which measures a time T during which a predetermined number of such pulses is generated. The measured value T is proportional to the actual rotational speed V of the rotary shaft 14 with a relatively good precision, and a substraction device 22 calculates a difference $\Delta T$ between the measured value T and the desired value $T_o$, which is equal to the counted value T when the rotary shaft 14 rotates at a desired rotational speed $V_o$. The value $T_o$ has been stored beforehand in a memory 24.

The difference $\Delta T$ obtained from the subtraction device 22, the counted value N from the counter device 16, a desired value $N_o$ from the memory 26, and a coefficient K are multiplied together in the multiplier 18 to obtain $\Delta T \cdot N \cdot N_o \cdot K$. The desired value No stored in the memory 26 is equal to the counted value N when the rotary shaft 14 rotates at the desired rotational speed $V_o$. Since the measured value T and the desired value $T_o$ are reversely and precisely proportional to the actual rotational speed V and to the desired speed $V_o$, respectively, the actual rotational speed V and the desired rotational speed $V_o$ can be given by $V = \alpha/T$ and $V_o = \alpha/T_o$. Further, since the counted value N and the desired value No are proportional to the actual rotational speed V and to the desired speed $V_o$, though the precision is not so high, the rotational speed V and the desired speed $V_o$ can be expressed as $V_o \simeq \beta N_o$ and Vo $\simeq \beta$No (where $\alpha$ and $\beta$ are constants). Accordingly, the multiplied result $\Delta V$ from the multiplier 18 can be expanded as follows:

$$V = \Delta T \cdot N \cdot N_o \cdot K = (T - T_o) N \cdot N_o \cdot K$$

$$= \left( \frac{\alpha}{V} - \frac{\alpha}{V_o} \right) N \cdot N_o \cdot K$$

$$= (V_o - V) \frac{\alpha}{V V_o} \cdot N \cdot N_o \cdot K$$

-continued $$\simeq (V_o - V)\alpha \cdot K/\beta^2$$

If K is defined as $K=\beta^2/\alpha$, $\Delta V$ becomes as $\Delta V \simeq V_o - V$. Thus, the multiplier 18 produces a value that corresponds to a difference between the actual rotational speed V of the rotary shaft 14 and the desired rotational speed $V_o$. If the actuator 28 is controlled by the value $V_o - V$ and the rotary shaft drive unit 12 is adjusted accordingly, it is possible to control the actual rotational speed to bring it into agreement with the desired rotational speed.

According to the present invention as mentioned above, the rotational speed of the rotary shaft can be controlled by feedback without the need of carrying out the division operation. Therefore, the control circuit can be simple to construct. When the operation is to be carried out by the software technique using a microcomputer, it is possible to reduce the number of operation steps in the feedback control as well as to reduce the operation time.

FIG. 2 illustrates an embodiment of the present invention which is adapted to a vehicle-speed control device of an internal combustion engine. In this embodiment, the rotary shaft is the drive shaft coupled to the drive wheels of the automobile, and the rotary shaft drive unit is the internal combustion engine. The components in FIG. 2 include a permanent magnet 30, which may be rotated by a speedometer cable, and a reed switch 32. The reed switch 32 is turned on and off by the fields of the permanent magnet 30 as the magnet rotates, and the pulses from the switch are fed to a wave-shaping circuit 34 consisting of, for example, a monostable multivibrator. Therefore, the frequency of the pulses produced by the wave-shaping circuit 34 is proportional to the actual rotational speed of the drive shaft, or in other words, proportional to the vehicle-running speed of the automobile.

The speed pulses are applied as clock pulses to binary counters 36 and 38. The counter 36 is reset by pulses of a predetermined period of, for example, 100 msec. from a pulse generator circuit 40. The counter 36 counts the speed pulses that are applied to it within that predetermined period of time, and the count is transferred to a latch circuit 42 once every 100 msec. Therefore, the content of the latch circuit 42 corresponds to the measured value N. The counter 38 counts the speed pulses, and produces a carry output when the counted value becomes equal to a predetermined value, for example, equal to "12". Thereafter, the counter 38 commences again the counting operation again from "0". The carry output of the counter 38 is fed to a flip-flop 44 to set and reset it alternatingly. One input terminal of, an AND gate 46 is connected to the output of the flip-flop 44 to keep the AND gate enabled until twelve speed pulses are generated. The AND gate permits clock pulses from a clock generator circuit 48 to pass through during this period. A binary counter 50 counts the number of clock pulses which pass through the AND gate 46 during an open interval of the gate, i.e., during the time in which twelve speed pulses are generated. These clock pulses are counted in a binary counter 50 in which the pulse count during the time the gate 46 is open corresponds to the measured value T mentioned earlier.

The content of the counter 50 is substracted in a subtraction circuit 52 from the output value of a memory 54, which output value corresponds to the desired value $T_o$. The subtracted result is fed to a multiplier circuit 56 in which the subtracted result (which corresponds to $T_o - T$) from the subtraction circuit 52, a counted value (which corresponds to N) from the latch circuit 42, a value corresponding to the above-mentioned desired value $N_o$ which is stored in the memory 58, and a coefficient K are multiplied together to produce a value corresponding to $V_o - V$. The latter value is applied to a duty cycle control circuit 60. The value, which corresponds to the difference between the actual rotational speed (actual vehicle speed) V and the desired rotational speed (desired vehicle speed) $V_o$, is obtained in quite the same manner as illustrated in connection with FIG. 1.

The duty cycle control circuit 60 is a known one for forming a signal having a duty ratio which corresponds to the input value, and consists of a presettable down counter and a clock generator circuit. The output signal of the duty cycle control circuit 60 is fed to an actuator 64 via a drive circuit 62 operating a control valve 64a in the actuator 64. While the electric current is being supplied, the control valve 64a interrupts the air introduced through a port 64b so that the intake vacuum pressure from a port 64c is introduced into a chamber 64d. When the flow of electric current is interrupted, the air is again able to pass into the chamber through the port 64b. Consequently, a diaphragm 64e moves a rod 64f linked to the accelerator link of the internal combustion engine, and the opening degree of the throttle valve of the engine is controlled to control the rotational speed by feedback. As constructions and operations of the duty control circuit 60 and the actuator 64 are widely known, their details are not illustrated here.

In a vehicle-speed control device, in general, it is necessary to detect the difference between the detected vehicle-speed and the desired vehicle-speed accurately to reduce the difference to zero by feedback. In the embodiment of the present invention, the difference in vehicle speed is calculated with good precision by simply relying upon the subtraction and multiplication operations without the need of the division operation. Accordingly, the control circuit can be simply constructed, the number of operation steps can be reduced, and the operation time can be reduced.

In addition to the vehicle-speed control for automobiles, the aforementioned rotational speed control method and apparatus can also be quite similarly applied to rotational speed control device for the engines, and to controlling by feedback the rotational speed of devices having a rotary drive shaft.

As many widely different embodiments of the present invention may be constructed without departing from the spirit and scope of the present invention, it should be understood that the present invention is not limited to the specific embodiments described in this specification, except as defined in the following claims.

I claim:

1. A method of controlling the rotational speed of a rotary shaft, said method comprising the steps of:
   generating speed pulses having a frequency proportional to an actual rotational speed V of said rotary shaft;
   measuring a time T until a predetermined number of said speed pulses are generated;
   calculating the difference $\Delta T$ between said measured time T and a predetermined time $T_o$ which is equal to the measured time T when said rotary shaft rotates at a desired rotational speed $V_o$;

measuring a number N of said speed pulses generated within a predetermined period of time;

multiplying said calculated difference $\Delta T$, said measured number N and a predetermined number $N_o$ which is equal to the measured number N when said rotary shaft rotates at the desired rotational speed $V_o$, said multiplying being performed to obtain a value $\Delta V$ which is equivalent to the difference between the actual rotational speed V and said desired rotational speed $V_o$; and controlling, in response to said value $\Delta V$ the rotational speed of said rotary shaft to reduce the difference between the actual rotational speed V and said desired rotational speed $V_o$ to zero.

2. A method as claimed in claim 1, wherein said generating step includes a step of generating a speed pulse each time said rotary shaft rotates by a predetermined angle.

3. A method as claimed in claim 1, wherein said time measuring step includes steps of:

counting a predetermined number of said speed pulses to generate a first signal that remains at a specific lvel during said counting operation; and while said first signal remains at said specific level, counting a number of clock pulses to generate a second signal which indicates said measured time T.

4. A method as claimed in claim 3, wherein said calculating step includes a step of subtracting a predetermined value corresponding to said predetermined time $T_o$ from the value of said second signal to generate a signal which indicates said difference $\Delta T$.

5. A method as claimed in claim 1, wherein said number measuring step includes the steps of:

generating a third signal having a predetermined frequency; and counting the number of said generated speed pulses in the interval of said third signal to generate a signal which indicates said measured number N.

6. A method as claimed in claim 1, 2, 3, 4 or 5, wherein said rotary shaft is a drive shaft of an automobile having a throttle valve, and said controlling step includes a step of controlling the rotational speed of said rotary shaft by adjusting the opening degree of said throttle valve in response to said value $\Delta V$ to reduce the difference between the actual rotational speed V and said desired rotational speed $V_o$ to zero.

7. Apparatus to control the speed of rotation of a rotary shaft driven by controllable power means comprising speed-control means, said apparatus comprising:

speed signal generating means to generate a repetitive signal that is synchronous with the rotation of said shaft;

first accumulating means connected to the speed signal generating means to accumulate a predetermined number of repetitions of the repetitive signal and to generate a time-representative signal T at the time of accumulation of said predetermined number;

subtraction circuit means to form a difference signal $\Delta T$ equal to the difference between the time-representative signal T and a predetermined-time representative signal $T_o$;

second accumulating means connected to the speed signal generating means to accumulate repetitions of the speed signal;

timing circuit means connected to the second accumulating means to allow the second accumulating means to accumulate repetitions of the speed signal for a predetermined length of time, the second accumulating means comprising number-signal generating means to generate a number signal N corresponding to the number of repetitions of the speed signal accumulated in the predetermined interval of time;

multiplying circuit means connected to the number-signal generating means and to the subtraction circuit means to multiply the difference signal by the number signal N and by a predetermined number signal $N_o$ representative of the number of repetitions of said speed signals that would be accumulated in the second accumulating circuit during said predetermined interval of time, if the shaft were rotating at a predetermined rotational speed $V_o$, to obtain a product signal proportional to the actual rotational speed V.

8. The apparatus of claim 7 comprising means to connect the multiplying circuit to the speed-control means to control the actual rotational speed V by the product signal to be substantially equal to the predetermined rotational speed $V_o$.

9. The apparatus of claim 7 in which the speed signal generating means comprises a pulse generator to generate a repetitive pulse signal synchronous with the rotation of said shaft.

10. The apparatus of claim 9 in which the first accumulating means comprises a first counter and circuit means to generate an output signal after a predetermined number of the pulses have been counted in the counter.

11. The apparatus according to claim 10 in which the first accumulating means further comprises:

a second counter;

a clock signal generator; and a gate circuit connected to the clock generator to receive clock signals therefrom and connected to be enabled by the first counter during the time required to accumulate the predetermined number of pulses from the pulse generator, whereby the gate circuit transmits clock signals to the second counter during the time the gate circuit is enabled.

12. The apparatus according to claim 7 comprising a memory recording the predetermined-time representative signal $T_o$, said memory being connected to the subtraction circuit means to supply the signal $T_o$ thereto.

13. The apparatus according to claim 9 in which the second accumulating means is an additional counter to accumulate speed signal pulses from the speed signal pulse generator.

14. The apparatus of claim 13 in which the timing circuit means comprises a second pulse generator, generating pulses spaced apart by said predetermined interval of time, said second pulse generator being connected to said additional counter to control the operation thereof to allow counting thereby between first and second ones of the pulses from the second pulse generator.

15. The apparatus according to claim 14 comprising latching circuit means connected to the additional counter and to the second pulse generator to retain a signal condition representative of the number of pulses counted by the additional counter during the time between the first and second ones of the pulses of the second pulse generator.

16. The apparatus according to claim 15 in which the multiplying circuit means is connected to the subtraction circuit and the latching circuit means to multiply the output signal of the subtraction circuit means by the signal condition of the latching circuit means.

17. The apparatus according to claim 16 comprising an additional memory connected to the multiplier circuit to supply thereto a signal condition representative of the number of pulses from the first-named pulse generator that would occur during the time between the first and second pulses of the second pulse generator if the repetition rate of pulses of the first-named pulse generator corresponded to a predetermined rotational speed $V_o$ of the rotary shaft.

* * * * *